(12) United States Patent
Ramanathan et al.

(10) Patent No.: US 12,489,684 B2
(45) Date of Patent: Dec. 2, 2025

(54) AUTOMATED SCALING OF NETWORK TOPOLOGIES USING UNIQUE IDENTIFIERS

(71) Applicant: Arrcus Inc., San Jose, CA (US)

(72) Inventors: Sethuraman Ramanathan, Fremont, CA (US); Ashok Patrick Jude Manoharan, Pleasanton, CA (US); Amol Iyer, San Jose, CA (US); Stephen Wall, Ashburn, VA (US); Keyur Patel, San Jose, CA (US)

(73) Assignee: Arrcus Inc., San Jose, CA (US)

( * ) Notice: Subject to any disclaimer, the term of this patent is extended or adjusted under 35 U.S.C. 154(b) by 528 days.

(21) Appl. No.: 17/886,114

(22) Filed: Aug. 11, 2022

(65) Prior Publication Data

US 2024/0056359 A1 Feb. 15, 2024

(51) Int. Cl.
*H04L 41/12* (2022.01)
(52) U.S. Cl.
CPC .................... *H04L 41/12* (2013.01)
(58) Field of Classification Search
CPC . H04L 41/12; H04L 41/0886; H04L 41/0843; H04L 12/28; H04L 12/46; H04L 45/02; H04L 12/00
See application file for complete search history.

(56) References Cited

U.S. PATENT DOCUMENTS

| 9,705,781 B1* | 7/2017 | Medved | H04L 45/50 |
| 2006/0203747 A1* | 9/2006 | Wright | H04L 45/50 |
| | | | 370/254 |
| 2014/0376402 A1* | 12/2014 | Dutt | H04L 41/0843 |
| | | | 370/254 |
| 2022/0103463 A1* | 3/2022 | Margaria | H04L 45/24 |

* cited by examiner

*Primary Examiner* — Ayaz R Sheikh
*Assistant Examiner* — David Zhijun Sun
(74) *Attorney, Agent, or Firm* — David R. Stevens; Stevens Law Group

(57) ABSTRACT

Systems and methods for improved data routing in network topologies. A method includes generating a configuration template for a network topology based on a topology descriptor file, wherein the network topology comprises a plurality of nodes, and wherein the topology descriptor file comprises a plurality of unique node tag identifiers that are each assigned to a node of the plurality of nodes within the network topology. The method includes resolving each of the plurality of unique node tag identifiers based on the plurality of nodes within the network topology and generating a network configuration for the network topology.

18 Claims, 12 Drawing Sheets

500

Build Network Topology File Comprising One Or More Tags. Each Of The One Or More Tags Is A Unique Identifier
502

Build Automated Configuration Template Comprising Data Pertaining To Each Node Within The Network Topology.
504

Resolve The Tags And Extract The Nodes, Addresses, And Link Data For The Network Topology.
506

Create Network Configuration And Send The Network Configuration To Applicable Routers.
508

500

Build Network Topology File Comprising One Or More Tags. Each Of The One Or More Tags Is A Unique Identifier
502

Build Automated Configuration Template Comprising Data Pertaining To Each Node Within The Network Topology.
504

Resolve The Tags And Extract The Nodes, Addresses, And Link Data For The Network Topology.
506

Create Network Configuration And Send The Network Configuration To Applicable Routers.
508

TAG FORMAT:

Node Level:

TAG-ROLE- NODE_NUMBER-PROTOCOL-V4_V6-INSTANCE-TAG_NAME

Interface Level:

TAG-PROTOCOL-V4/V6-SCALE-INSTANCE-TAG_NAME

FIG. 6

```
topology:

nodes:

r1:

tags: [ "TAG-P-1-ISIS-V4-default-ISIS1", " TAG-P-1-BGP-V4-default-BGP1_BGP2-AS1" ]

interfaces:
        r1_1:
        tags: [ " TAG-ISIS-V4-10-default-ISIS1 " ]

r1_2:
        tags: [ "TAG-BGP-V4-10-default-BGP1" ]

r1_loopback1:
        tags: [ "TAG-BGP-V4-1-default-BGP2" ]

r2:
        tags: [ "TAG-P-2-ISIS-V4-default-ISIS1", " TAG-P-2-BGP-V4-default-BGP1_BGP2-AS1"]

interfaces:
        r2_1:
        tags: [ " TAG-ISIS-V4-10-default-ISIS1 " ]

r2_2:
        tags: [ "TAG-BGP-V4-10-default-BGP1" ]

r2_loopback1:
        tags: [ "TAG-BGP-V4-1-default-BGP2" ]

links:
        p2p1:

interfaces: [ "r1_1","r2_1" ]
        p2p2:

interfaces: [ "r1_2","r2_2" ]
```

FIG. 7

```
nodes:
 r1:
 interfaces:
   r1_1:
     subinterfaces:
       - range: 0..10
         ipv4: 11.11.11.1/24
         tag:["ISIS1"]

r1_2:
     subinterfaces:
       - range: 0..10
         ipv4:14.11.11.1/24
         tag:["BGP1]

loopback1:
     subinterfaces:
       - range: 0..10
         ipv4:32.11.11.1/32
         tag: ["BGP2"]
```

```
isis:
 - type: ISIS
   name: p1
   net:
     - 49.0001.0001.0001.0001.00 interfaces:
     - interface:
         - tag['ISIS1']
bgp:
 - type: BGPv4
   name: red
   as: 4001
   router-id: 32.11.11.1
   neighbors:
     - peer-as: 2001
       bfd: true
       neighbor-address:
         - tag['BGP1', "BGP2"]
```

```
nodes:
 r2:
  interfaces:
   r2_1:
    subinterfaces:
     - range: 0..10
       ipv4: 12.11.11.1/24
       tag: [ISIS1]

r2_2:
    subinterfaces:
     - range: 0..10
       ipv4: 13.11.11.1/24
       tag:["BGP1"]

loopback1:
    subinterfaces:
     - range: 0..10
       ipv4: 22.11.11.1/32
       tag:
        - ["BGP2"]
```

```
isis:
 - type: ISIS
   name: p1
   net:
    - 49.0001.0001.0001.0002.00 interfaces:
    - interface:
       - tag['ISIS1']
bgp:
 - type: BGPv4
   name: red
   as: 2001
   router-id: 22.11.11.1
   neighbors:
    - peer-as: 4001
      bfd: true
      neighbor-address:
       - tag['BGP1', BGP2"]
```

```
links:

p2p1:
    interfaces: [ "r1_1", "r2_1" ]

p2p2:
    interfaces: [ "r1_2", "r2_2" ]

links:

p2p1:
    tag: ["broadcast"]
    interfaces: [ "r1_1", "b1_1" ]

p2p2:
    tag: ["broadcast"]
    interfaces: [ "r2_1", "b1_2" ]

p2p3:
    tag: ["broadcast"]
    interfaces: [ "r3_1", "b1_3" ]

topology:

nodes:

r1:
   interfaces:
       r1_1:

r1_2:

r1_loopback1
```

```
topology:
  nodes:
    r1:
      tags: [ " TAG-P-1-BGP-V4-default-BGP1-AS_TAG1" ]
      interfaces:
        r1_1:
          tags: [ "TAG-BGP-V4-10-default-BGP1" ]

r1_loopback1:
          tags: [ "TAG-BGP-V4-1-default-BGP1" ]
topology:
  nodes:
    r1:
      tags: [ " TAG-RR-1-BGP-V4-default-BGP1-AS_TAG1-CLUSTER_TAG1" ]
      interfaces:
        r1_1:
          tags: [ "TAG-BGP-V4-10-default-BGP1" ]
        r1_loopback1:
          tags: [ "TAG-BGP-V4-1-default-BGP1" ]
```

FIG. 10

AUTOMATED SCALING OF NETWORK TOPOLOGIES USING UNIQUE IDENTIFIERS

TECHNICAL FIELD

The disclosure relates to computing networks and particularly relates to network topology and routing protocols in a computer networking environment.

BACKGROUND

Network computing is a means for multiple computers or nodes to work together and communicate with one another over a network. There exist wide area networks (WAN) and local area networks (LAN). Both wide and local area networks allow for interconnectivity between computers. Local area networks are commonly used for smaller, more localized networks that may be used in a home, business, school, and so forth. Wide area networks cover larger areas such as cities and can even allow computers in different nations to connect. Local area networks are typically faster and more secure than wide area networks, but wide area networks enable widespread connectivity. Local area networks are typically owned, controlled, and managed in-house by the organization where they are deployed, while wide area networks typically require two or more constituent local area networks to be connection over the public Internet or by way of a private connection established by a telecommunications provider.

Local and wide area networks enable computers to be connected to one another and transfer data and other information. For both local and wide area networks, there must be a means to determine a path by which data is passed from one compute instance to another compute instance. This is referred to as routing. Routing is the process of selecting a path for traffic in a network or between or across multiple networks. The routing process usually directs forwarding based on routing tables which maintain a record of the routes to various network destinations. Routing tables may be specified by an administrator, learned by observing network traffic, or built with the assistance of routing protocols.

Small networks may use manually configured routing tables to determine how information should travel from one computer to another computer. A routing table may include a listing of "best paths" indicating the most efficient or most desirable paths between a starting computer and a destination computer. Larger networks, including networks connected to the public Internet, may rely on complex topologies that can change rapidly such that the manual construction of routing tables is unfeasible. Dynamic routing attempts to solve this problem by constructing routing tables automatically based on information carried by routing protocols. Dynamic routing enables a network to act nearly autonomously in avoiding network failures and blockages. There exist multiple routing protocols that provide rules or instructions for determining best paths between networked devices. Examples of dynamic routing protocols and algorithms include Routing Information Protocol (RIP), Open Shortest Path First (OSPF), Enhanced Interior Gateway routing Protocol (EIGRP), and Border Gateway Protocol (BGP).

In some instances, path selection involves applying a routing metric to multiple routes to select or predict the best route. Most routing algorithms use only one network path at a time. Multiple path routing techniques enable the use of multiple alternative paths. In computer networks, a routing algorithm may be used to predict the best path between two compute instances. The routing algorithm may be based on multiple factors such as bandwidth, network delay, hop count, path cost, load, maximum transfer unit, reliability, and communication cost. The routing table stores a listing of the best paths. A topological database may store a list of the best paths and may further store additional information.

In some networks, routing is complicated by the fact that no single entity is responsible for selecting best paths. Instead, multiple entities are involved in selecting best paths or event portions of a single path. In the context of computer networking over the Internet, the Internet is partitioned into autonomous systems (AS) such as Internet Service Providers (ISPs). Each autonomous system controls routes involving its network. Autonomous system-level paths are selected based on the Border Gateway Protocol (BGP). Each autonomous system-level path includes a sequence of autonomous systems through which packets of information flow to travel from one compute instance to another compute instance. Each autonomous system may have multiple paths from which to choose that are offered by neighboring autonomous systems.

In many instances, it is important to scale and modify a network topology in real-time to account for new nodes, new interfaces, new technologies, and so forth. However, traditional network topology systems do not allow for automated scaling and modification of network topologies.

Considering the foregoing, disclosed herein are systems, methods, and devices for automatically scaling a network topology by implementing unique tag identifiers as described herein.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood regarding the following description and accompanying drawings where:

FIG. 5 is a schematic flowchart diagram of a method for building and implementing a network configuration including unique tag identifiers for automated scaling and reconfiguration;

FIG. 6 is a block illustrating an example format for a unique tag identifier at the node level and at the interface level;

FIG. 7 is a block illustrating an example network topology that includes unique tag identifiers for nodes, interfaces, and links;

FIGS. 8A-8B are blocks illustrating an example autogenerated configuration template for a unique tag identifier;

FIG. 9 is a block illustrating an example autogenerated configuration template for an Internet Protocol network topology using unique tag identifiers;

FIG. 10 is a block illustrating an example autogenerated configuration template for a network topology implementing unique tag identifiers.

DETAILED DESCRIPTION

Figure 1:
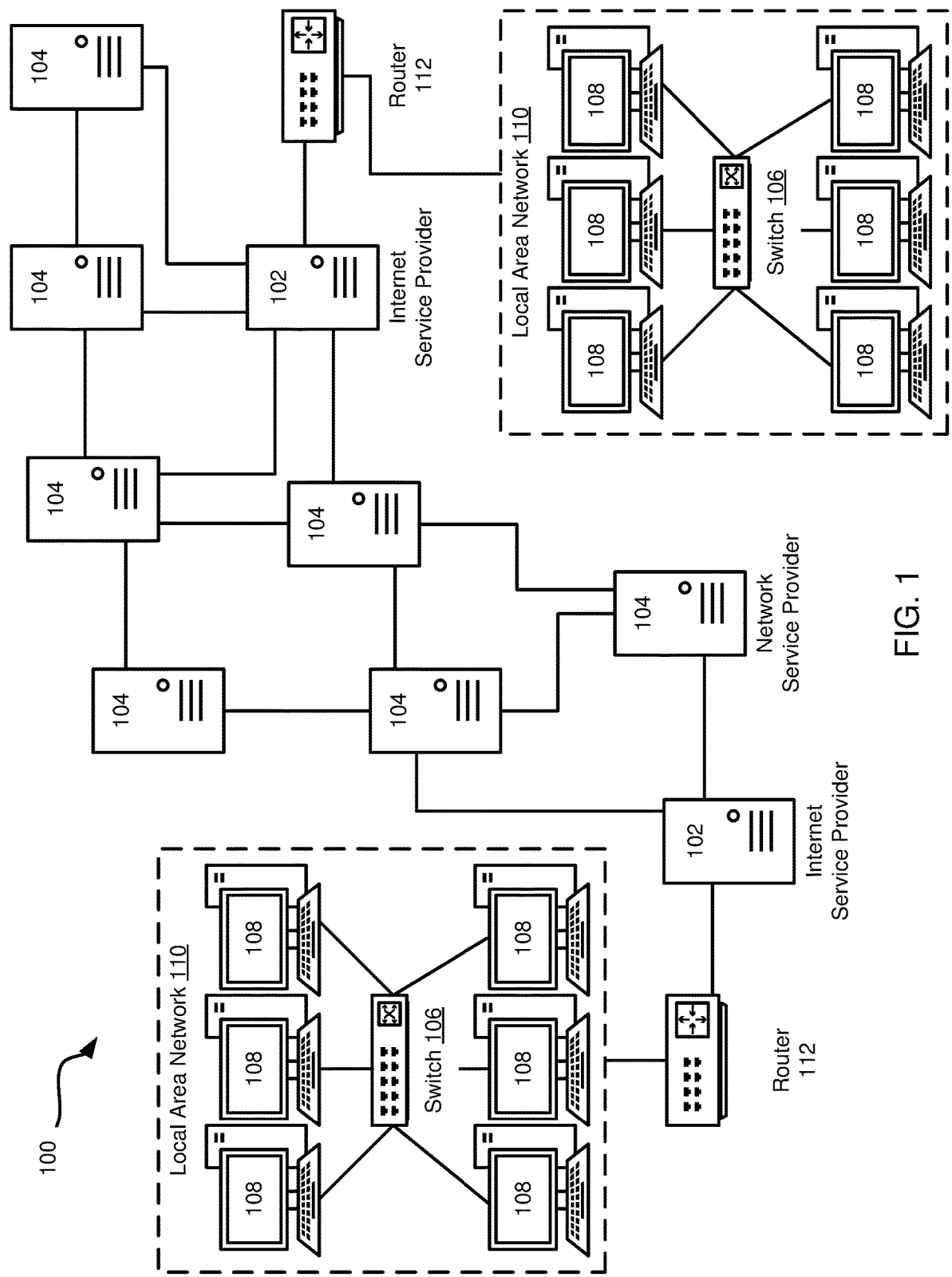
FIG. 1 is a schematic diagram of an example system of networked devices communicating over the Internet.

Disclosed herein are systems, methods, and devices for topology-independent automation for scaling and modifying network topologies. The systems, methods, and devices described herein implement the use of "tags," which may be referred to herein as tag identifiers. The tag identifiers may be applied to nodes, interfaces, and links within the network topology.

The tag identifiers described herein are implemented to enable automated scaling and modification of network topologies for end-to-end configuration and verification. The tag identifiers described herein may be implemented in topologies using the Border Gateway Protocol (BGP), Resource Reservation Protocol (RSVP), Internet Protocol Secure (IPSEC), Language Server Protocol (LSP), Virtual Private Network (VPN) protocols, Intermediate System-Intermediate System (IS-IS) protocol, Open Shortest Path First (OSPF) protocol, and other protocols not specifically described herein. The tag identifiers described herein are topology independent and protocol agnostic.

In traditional systems, the data within a network topology must be built manually. Depending on the implementation, this data may include, for example, peer Internet Protocol (IP) addresses, peer Label Switched Path (LSP) IP addresses, interface names, and so forth. It is arduous and imprecise to build this data manually and to manually map each node within the network topology. Additionally, these traditional systems make automation overly complex. Traditional systems do not offer a scalable approach for increasing the size of the topology (i.e., adding additional nodes, interfaces, and links) or for making amendments to the existing topology. In these traditional systems, when there is a change in the topology, the corresponding data for the deleted nodes must be manually updated to remove the node from the configurable list. This change must be updated on each data list per node level that holds the peer address details for the deleted node. This further impacts the verification process for peer states; if the change is not updated, then the verification checks on corresponding nodes will be negatively impacted.

The tag identifiers described herein address the issues outlined above. The systems, methods, and devices described herein implement tag identifier mapping to a network topology. When the tag identifiers are implemented, a computing system may automatically scale the network topology by identifying new nodes, resolving the tag identifiers, retrieving information for new nodes, and creating configurations to send to routers within the topology. This virtually eliminates the need for manual human interaction when scaling and adjusting the network topology.

The tag identifiers may be implemented at the node level ("node tag identifiers") and at the interface level ("interface tag identifiers"). The node tag identifiers include information about the role of the node, the number for the node within the protocol, a name for the node tag identifier, and so forth. The interface tag identifiers include information regarding the protocol and a name for the interface tag identifier. These tag identifiers are used to automate the scaling and adjustment of the network topology.

The following is presented as further background for the disclosures presented herein. In a computer network environment, a networking device such as a switch or router may be used to transmit information from one destination to a destination. In an embodiment, a data package and a message may be generated at a first location such as computer within a person's home. The data package and the message could be generated from the person interacting with a web browser and requesting information from or providing information to a remote server accessible over the Internet. In an example, the data package and the message could be information the person input into a form accessible on a webpage connected to the Internet. The data package and the message may need to be transmitted to the remote server that may be geographically located far from the person's computer. It is likely that there is no direct communication between the router at the person's home and the remote server. Therefore, the data package and the message must travel by "hopping" to different networking devices until reaching the destination at the remote server. The router at the person's home must determine a route for transmitting the data package and the message thru multiple different devices connected to the Internet until the data package and the message reach the destination at the remote server.

The processes of determining a best bath from a first location to a destination and forwarding data packages and messages to a next destination are significant functions performed by a networking device such as a switch or router. The connections between networking devices in a network is referred to as the network topology. Network topology is the arrangement of elements such as links and nodes in a communication network. A network topology may include wired links, wireless links, or a combination of wired and wireless links between nodes in the network. Some examples of wired links include coaxial cables, telephone lines, power lines, ribbon cables, optical fibers, and so forth. Some examples of wireless links include satellites, cellular signals, radio signals, free-space optical communication, and so forth. The network topology includes an indication of all nodes in the network (e.g., computers, routers, switches, and other devices) and an indication of the linkages between nodes. Disclosed herein are systems, methods, and devices for improving network topology and network routing.

For purposes of furthering understanding of the disclosure, some explanation will be provided for numerous networking computing devices and protocols.

A BGP instance is a device for routing information in a network. A BGP instance may take the form of a route reflector appliance. The BGP instance may run on a switch, router, or BGP speakers on a switch. At a high level, the BGP instance sends all the paths it has learnt for a prefix to the best path controller. The best path controller responds with a set of best path from amongst those paths. The best path controller is permitted to modify the next-hop and attributes for any of the paths. Once the best paths are received, the BGP instance updates the local Routing Information Base (RIB) and advertises the best path out to its neighbors.

A switch (may alternatively be referred to as a switching hub, bridging hub, or MAC bridge) creates a network. Most internal networks use switches to connect computers, printers, phones, camera, lights, and servers in a building or campus. A switch serves as a controller that enables networked devices to talk to each other efficiently. Switches connect devices on a computer network by using packet switching to receive, process, and forward data to the destination device. A network switch is a multiport network bridge that uses hardware addresses to process and forward data at a data link layer (layer 2) of the Open Systems Interconnection (OSI) model. Some switches can also process data at the network layer (layer 3) by additionally incorporating routing functionality. Such switches are commonly known as layer-3 switches or multilayer switches.

A router connects networks. Switches and routers perform similar functions, but each has its own distinct function to perform on a network. A router is a networking device that forwards data packets between computer networks. Routers perform the traffic directing functions on the Internet. Data sent through the Internet, such as a web page, email, or other form of information, is sent in the form of a data packet. A packet is typically forwarded from one router to another router through the networks that constitute an internetwork (e.g., the Internet) until the packet reaches its destination node. Routers are connected to two or more data lines from different networks. When a data packet comes in on one of the lines, the router reads the network address information in the packet to determine the ultimate destination. Then, using information in the router's routing table or routing policy, the router directs the packet to the next network on its journey. A BGP speaker is a router enabled with the Border Gateway Protocol (BGP).

A customer edge router (CE router) is a router located on the customer premises that provides an interface between the customer's LAN and the provider's core network. CE routers, provider routers, and provider edge routers are components in a multiprotocol label switching architecture. Provider routers are in the core of the provider's or carrier's network. Provider edge routers sit at the edge of the network. Customer edge routers connect to provider edge routers and provider edge routers connect to other provider edge routers over provider routers.

A routing table or routing information base (RIB) is a data table stored in a router or a networked computer that lists the routes to particular network destinations. In some cases, a routing table includes metrics for the routes such as distance, weight, and so forth. The routing table includes information about the topology of the network immediately around the router on which it is stored. The construction of routing tables is the primary goal of routing protocols. Static routes are entries made in a routing table by non-automatic means and which are fixed rather than being the result of some network topology discovery procedure. A routing table may include at least three information fields, including a field for network ID, metric, and next hop. The network ID is the destination subnet. The metric is the routing metric of the path through which the packet is to be sent. The route will go in the direction of the gateway with the lowest metric. The next hop is the address of the next station to which the packet is to be sent on the way to its destination. The routing table may further include quality of service associate with the route, links to filtering criteria lists associated with the route, interface for an Ethernet card, and so forth.

For purposes of illustrating the concept of a routing table, the routing table may be analogized to using a map for delivering a package. A routing table is like the use of a map for delivering a package to its final destination. When a node needs to send data to another node on a network, the node must first know where to send the data. If the node cannot directly connect to the destination node, the node must send the data to other nodes along a proper route to the destination node. Most nodes do not try to figure out which routes might work. Instead, a node will send an IP packet to a gateway in the LAN, which then decides how to route the data to the correct destination. Each gateway will need to keep track of which way to deliver various packages of data, and for this it uses a routing table. A routing table is a database that keeps track of paths, like a map, and uses these paths to determine which way to forward traffic. Gateways can also share the contents of their routing table with other nodes requesting the information.

For hop-by-hop routing, each routing table lists, for all reachable destinations, the address of the next device along the path to that destination, i.e., the next hop. Assuming the routing tables are consistent, the algorithm of relaying packets to their destination's next hop thus suffices to deliver data anywhere in a network. Hop-by-hop is a characteristic of an IP Internetwork Layer and the Open Systems Interconnection (OSI) model.

The Open Systems Interconnection (OSI) model is a conceptual model that characterizes and standardizes the communication functions of a computing system without regard to its underlying internal structure and technology. The goal of the OSI model is the interoperability of diverse communication aids systems with standard communication protocols. The OSI model partitions a communication system into abstraction layers. A layer serves the layer above it and is served by the layer below. For example, a layer that provides error-free communications across a network provides the path needed by applications above it, while it calls the next lower layer to send and receive packets that constitute the contents of that path. Two instances at the same layer are visualized as connected by a horizontal connection in that layer. Communication protocols enable an entity in one host to interact with a corresponding entity at the same layer in another host. Service definitions, like the OSI model, abstractly describe the functionality provided to an (N)-layer by an (N−1)-layer, wherein N is one of the layers of protocols operating in the local host.

Route control is a type of network management that aims to improve Internet connectivity and reduce bandwidth cost and overall internetwork operations. Some route control services include a suite of hardware-based and software-based products and services that work together to improve overall Internet performance and finetune the use of available Internet bandwidth at minimal cost. Route control can be successful in scenarios where a network or autonomous system is sourcing Internet bandwidth from multiple providers. Route control can aid in the selection of the most optimal path for data transmission.

Some network communication systems are large, enterprise-level networks with thousands of processing nodes. The thousands of processing nodes share bandwidth from multiple Internet Service Providers (ISPs) and can process significant Internet traffic. Such systems can be extremely complex and must be properly configured to result in acceptable Internet performance. If the systems are not properly configured for optimal data transmission, the speed of Internet access can decrease, and the system can experience high bandwidth consumption and traffic. To counteract this problem, a set of services may be implemented to remove or reduce these concerns. This set of services may be referred to as routing control.

An embodiment of a routing control mechanism is composed of hardware and software. The routing control mechanism monitors all outgoing traffic through its connection with an Internet Service Provider (ISP). The routing control mechanism aids in selecting the best path for efficient transmission of data. The routing control mechanism may calculate the performance and efficiency of all ISPs and select only those ISPs that have performed optimally in applicable areas. Route control devices can be configured according to defined parameters pertaining to cost, performance, and bandwidth.

A known algorithm for determining the best path for the transmission of data is referred to as the Border Gateway Protocol (BGP). BGP is a path-vector protocol that provides routing information for autonomous systems on the Internet. When BGP is configured incorrectly, it can cause sever availability and security issues. Further, modified BGP route information can permit attackers to redirect large blocks of traffic so the traffic travels to certain routers before reaching its intended destination. The BGP best path algorithm can be implemented to determine the best path to install in an Internet Protocol (IP) routing table for traffic forwarding. BGP routers may be configured to receive multiple paths to the same destination.

The BGP best path algorithm assigns a first valid path as the current best path. The BGP best path algorithm compares the best path with the next path in the list until the BGP reaches the end of the list of valid paths. The list provides the rules that are used to determine the best path. For example, the list may include an indication that the path with the highest weight is preferred, the path without a local preference is preferred, the path that was locally originated by way of a network or aggregate BGP is preferred, a shortest path is preferred, a path with the lowest multi-exit discriminator is preferred, and so forth. The BGP best path selection process can be customized.

In the context of BGP routing, each routing domain is known as an autonomous system (AS). BGP assists in selecting a path through the Internet to connect two routing domains. BGP typically selects a route that traverses the least number of autonomous systems, referred to as the shortest AS path. In an embodiment, once BGP is enabled, a router will pull a list of Internet routes from BGP neighbors which may be ISPs. BGP will then scrutinize the list to find routes with the shortest AS paths. These routes may be entered in the router's routing table. Generally, a router will choose the shortest path to an AS. BGP uses path attributes to determine how to route traffic to specific networks.

Equal cost multipath (ECMP) routing is a routing strategy where next-hop packet forwarding to a single destination can occur over multiple "best paths." The multiple best paths are equivalent based on routing metric calculations. Multiple path routing can be used in conjunction with many routing protocols because routing is a per-hop decision limited to a single router. Multiple path routing can substantially increase bandwidth by load-balancing traffic over multiple paths. However, there are numerous issues known with ECMP routing when the strategy is deployed in practice. Disclosed herein are systems, methods, and devices for improved ECMP routing.

A Clos network can be deployed in telecommunications. A Clos network is a multistage circuit-switching network that represents an idealization of multistage switching systems. A Clos network includes three stages, including the ingress stage, the middle stage, and the egress stage. Each stage is made up of a number of crossbar switches. Each cell enters an ingress crossbar switch that can be routed through any of the available middle stage crossbar switches to the relevant egress crossbar switch. A middle stage crossbar is available for a particular new call if both the link connecting the ingress switch to the middle stage switch, and the link connecting the middle stage switch to the egress switch, are free.

A leaf-spine network topology can be deployed for connecting nodes in a computer network. The leaf-spine topology has two layers, including the leaf layer and the spine layer. The leaf layer consists of access switches that connect to devices like servers, firewalls, load balancers, and edge routers. The spine layer is made up of switches that perform routing and forms the backbone of the network where every leaf switch is interconnected with each spine switch. In a leaf-spine topology, all devices are located the same number of links away from each other and include a predictable and consistent amount of delay or latency for transmitting information.

A virtual local area network (VLAN) is a broadcast domain that is partitioned and isolated in a computer network at the data link layer. A VLAN may apply tags to network frames and handle those tags in networking systems to create the appearance and functionality of network traffic that is physically on a single network but acts as if it is split between separate networks. VLANs can keep network applications separate despite being connected to the same physical network, and without requiring multiple sets of cabling and networking devices to be deployed.

A switched virtual interface (SVI) is a virtual interface and port that transmits untagged-VLAN packets for a managed switch. Traditionally, switches send traffic only to hosts within the same broadcast domain (single VLAN) and routers handle traffic between different broadcast domains (different VLANs). In such an implementation, network devices in different broadcast domains cannot communicate without a router. When an SVI is implemented, a switch may use a virtual Layer3 interface to route traffic to other Layer3 interfaces. This eliminates the need for a physical router. VLANs reduce the load on a network by dividing a LAN into smaller segments and keeping local traffic within a VLAN. However, because each VLAN has its own domain, there is a need for a mechanism for VLANs to pass data to other VLANs without passing the data through a router. The SVI is such a mechanism. An SVI is normally found on switches (for example, Layer3 and Layer2 switches). When an SVI is implemented, a switch can recognize packet destinations that are local to the sending VLAN and can switch those packets destined for different VLANs. In an embodiment, there is one-to-one mapping between a VLAN and an SVI. In such an embodiment, only a single SVI can be mapped to a VLAN.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems, and methods for tracking the life cycle of objects in a network computing environment are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates a schematic diagram of a system 100 for connecting devices to the Internet. The system 100 includes multiple local area network 110 connected by a switch 106. Each of the multiple local area networks 110 can be connected to each other over the public Internet by way of a router 162. In the example system 100 illustrated in FIG. 1, there are two local area networks 110. However, it should be appreciated that there may be many local area networks 110 connected to one another over the public Internet. Each local area network 110 includes multiple computing devices 108 connected to each other by way of a switch 106. The multiple computing devices 108 may include, for example, desktop computers, laptops, printers, servers, and so forth. The local area network 110 can communicate with other networks over the public Internet by way of a router 162. The router 162 connects multiple networks to each other. The router 162 is connected to an internet service provider 102. The internet service provider 102 is connected to one or more network service providers 104. The network service providers 104 are in communication with other local network service providers 104 as shown in FIG. 1.

The switch 106 connects devices in the local area network 110 by using packet switching to receive, process, and forward data to a destination device. The switch 106 can be configured to, for example, receive data from a computer that is destined for a printer. The switch 106 can receive the data, process the data, and send the data to the printer. The switch 106 may be a layer-1 switch, a layer-2 switch, a layer-3 switch, a layer-4 switch, a layer-7 switch, and so forth. A layer-1 network device transfers data but does not manage any of the traffic coming through it. An example of a layer-1 network device is an Ethernet hub. A layer-2 network device is a multiport device that uses hardware addresses to process and forward data at the data link layer (layer 2). A layer-3 switch can perform some or all the functions normally performed by a router. However, some network switches are limited to supporting a single type of physical network, typically Ethernet, whereas a router may support various kinds of physical networks on different ports.

The router 162 is a networking device that forwards data packets between computer networks. In the example system 100 shown in FIG. 1, the routers 162 are forwarding data packets between local area networks 110. However, the router 162 is not necessarily applied to forwarding data packets between local area networks 110 and may be used for forwarding data packets between wide area networks and so forth. The router 162 performs traffic direction functions on the Internet. The router 162 may have interfaces for diverse types of physical layer connections, such as copper cables, fiber optic, or wireless transmission. The router 162 can support different network layer transmission standards. Each network interface is used to enable data packets to be forwarded from one transmission system to another. Routers 162 may also be used to connect two or more logical groups of computer devices known as subnets, each with a different network prefix. The router 162 can provide connectivity within an enterprise, between enterprises and the Internet, or between internet service providers' networks as shown in FIG. 1. Some routers 162 are configured to interconnecting various internet service providers or may be used in large enterprise networks. Smaller routers 162 typically provide connectivity for home and office networks to the Internet. The router 162 shown in FIG. 1 may represent any suitable router for network transmissions such as an edge router, subscriber edge router, inter-provider border router, core router, internet backbone, port forwarding, voice/data/fax/video processing routers, and so forth.

The internet service provider (ISP) 102 is an organization that provides services for accessing, using, or participating in the Internet. The ISP 102 may be organized in various forms, such as commercial, community-owned, non-profit, or privately owned. Internet services typically provided by ISPs 102 include Internet access, Internet transit, domain name registration, web hosting, Usenet service, and colocation. The ISPs 102 shown in FIG. 1 may represent any suitable ISPs such as hosting ISPs, transit ISPs, virtual ISPs, free ISPs, wireless ISPs, and so forth.

The network service provider (NSP) 104 is an organization that provides bandwidth or network access by providing direct Internet backbone access to Internet service providers. Network service providers may provide access to network access points (NAPs). Network service providers 104 are sometimes referred to as backbone providers or Internet providers. Network service providers 104 may include telecommunication companies, data carriers, wireless communication providers, Internet service providers, and cable television operators offering high-speed Internet access. Network service providers 104 can also include information technology companies.

It should be appreciated that the system 100 illustrated in FIG. 1 is exemplary only and that many different configurations and systems may be created for transmitting data between networks and computing devices. Because there is a great deal of customizability in network formation, there is a desire to create greater customizability in determining the best path for transmitting data between computers or between networks. Considering the foregoing, disclosed herein are systems, methods, and devices for offloading best path computations to an external device to enable greater customizability in determining a best path algorithm that is well suited to a certain grouping of computers or a certain enterprise.

Figure 2:
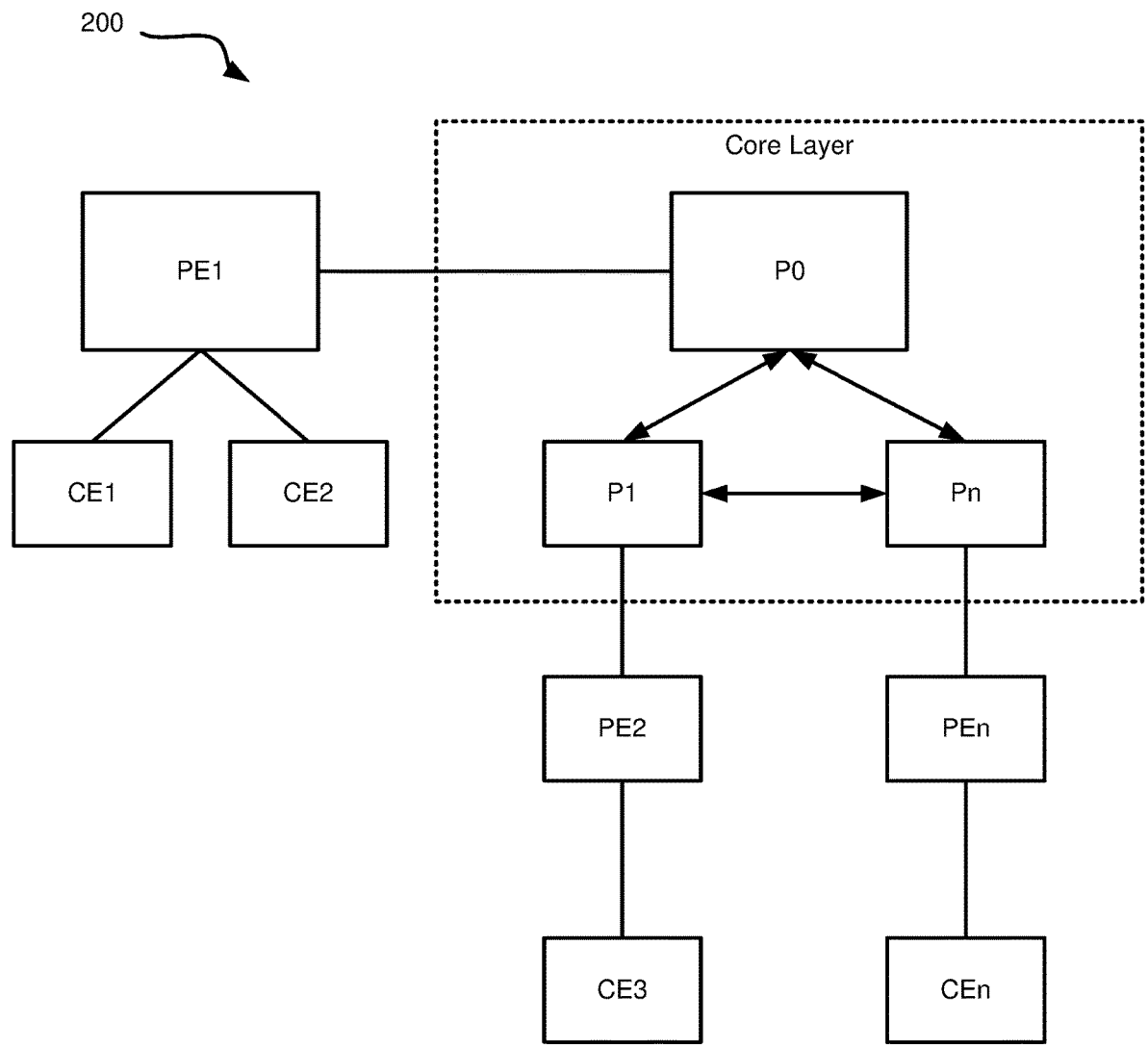
FIG. 2 is a schematic block diagram of an example network topology including a core layer, edge layer, and customer layer as known in the prior art.

FIG. 2 is a schematic block diagram of an example network topology 200. The network topology 200 includes a core layer comprising P0, P1, and up through Pn nodes. The network topology includes an edge layer comprising PE1, PE2, and up through PEn nodes. The network topology 200 includes a customer layer comprising CE1, CE2, CE3, and up through CEn nodes. The network topology 200 illustrates the challenges associated with amending and expanding traditional topographical networks.

In traditional systems, the network topology 200 requires significant maintenance to ensure that all nodes are correctly configured. In most cases, the network topology 200 will continually be updated to add new nodes, amend existing nodes, and delete existing nodes. Each time the network topology 200 is updated, the configurations for each node must be updated to reflect the revised network topology 200.

BGP topologies are deployed in P0 to Pn and between PE1 and PEn to P0 to Pn. In an implementation, the network topology 200 is a full mesh BGP session, and in this case, there will be N−1 session on each node to remote nodes. In this case, the topology is implemented by finding N−1 IP addresses. This may be entered manually by a user. This will complicate the manageability of the network topology 200 because every node will need to be updated when a node is added, amended, or deleted.

RSVP LSPs are deployed between PE1 to PEn. The difficulties discussed in connection with BGP will also be seen in an RSVP LSP implementation. VPN is deployed between PE1 to PEn. Each PE node is configured with a one-to-many interface as part of the VPN. When there is a change in the VPN or interfaces, each PE node must be updated. Again, this creates a manageability issue. OSPF is deployed on all links between PE1 to PEn and between P0 to Pn. OSPF experiences the same manageability issues associated with a VPN implementation.

In an example implementation, the network topology 200 is implemented as a full mesh BGP peer network that can be expanded and modified with automated protocols. In some cases, the IP addresses must be built and modified manually, and this is difficult to maintain when the topology changes. In this BGP implementation, each node in the network topology 200 is associated with N−1 peers. This is accomplished by building N−1 loops using data for the required peers on each node. This makes it difficult to automate the network topology 200, and therefore, this is not a scalable approach when the quantity and configuration of the nodes in the network topology 200 is increased or adjusted. In this network topology 200, when there is a change in the topology, the corresponding data for a deleted node must be manually updated to remove the node from the configurable list. This is difficult to maintain and leads to issues in the functionality and efficiency of the modified topology. Additionally, all changes must be updated on each data list for each node level that holds peer address details. This data further impacts the verification of peer states. If the modifications are not updated, then the verification checks on corresponding nodes will be negatively impacted.

In a further example implementation, the network topology 200 is implemented as a full mesh RSVP LSPs or IPSEC topology using automation. In this case, the data (i.e., peer LSP IP addresses) must be built manually, and this is difficult to maintain when the topology changes with time. In this RSVP LSPs or IPSEC implementation, each node is associated with N−1 peers, and this is accomplished by causing N−1 loops to run using data for the required LSP peers on each node. This makes automation overly complex and is not scalable approach when the quantity and configuration of nodes in the topology increases. In this network topology 200, when there is a change in the topology, the corresponding data for the deleted node is updated manually to remove the node from the configurable list. This creates a manageability issue. These changes must be updated on each data list per node level that holds the peer address details. Additionally, this impacts the verification of peer states if the change is not updated throughout the network topology 200.

Figure 3:
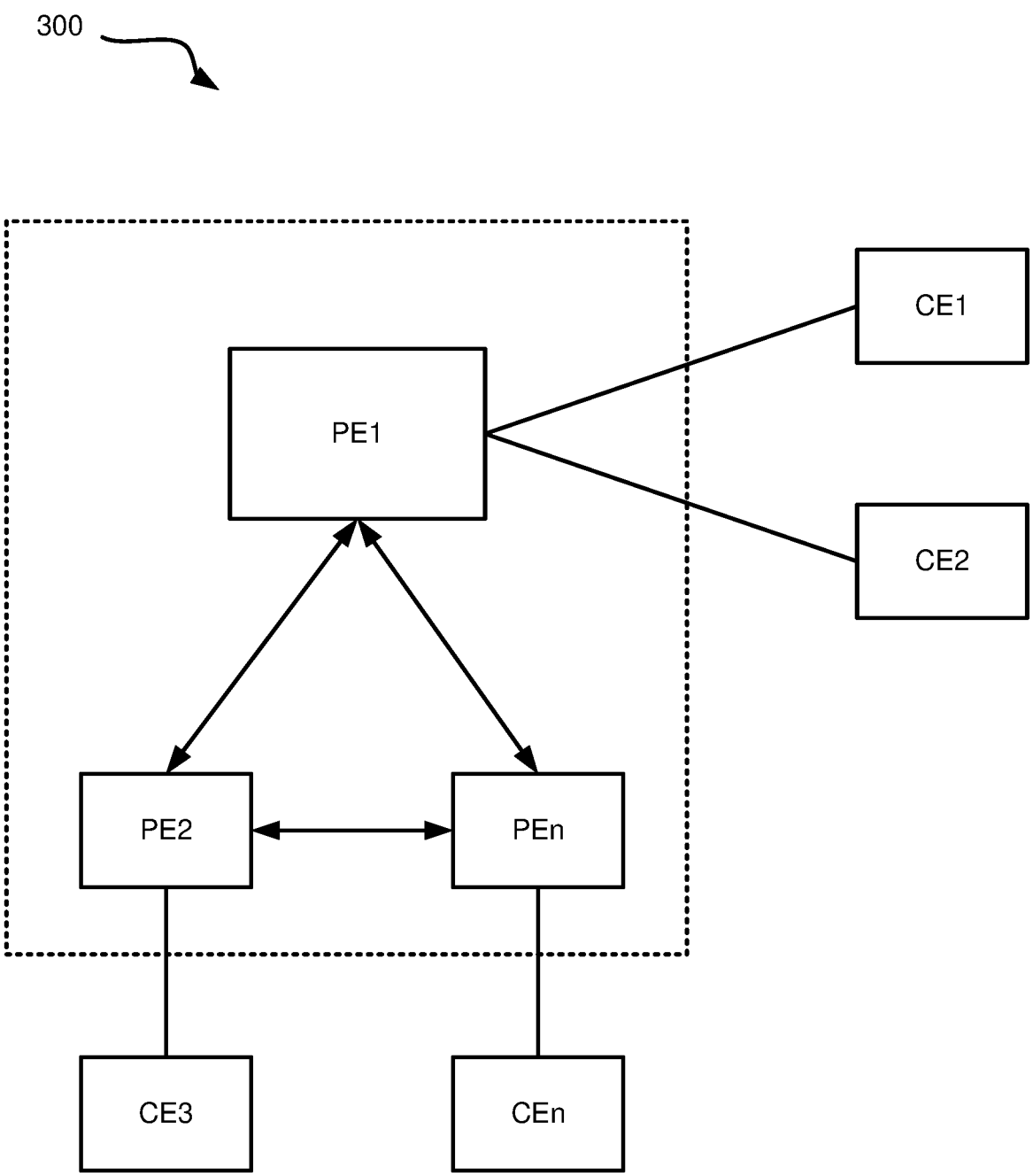
FIG. 3 is a schematic block diagram of an example network topology including a core layer, edge layer, and customer layer as known in the prior art.

FIG. 3 is a schematic block diagram of an example network topology 300. The network topology 300 illustrates an example VPN network. The network topology 300 includes a topology with PE1 through PEn nodes. In this example, the requirement is to build a L3VPN topology using automation. The data (in this case, the interface names) on every node are configured to map to a specific VPN that must be manually built. This is difficult to maintain when the topology changes.

Each node in the network topology 300 includes N links and n sub interfaces. To accomplish this configuration, N loops must be built using data for the required links on each node. Thus, the network topology 300 must include n loops within each N loop. This process must be repeated for each node. This makes the automation overly complex and is not a scalable approach when nodes or links in the topology increases or changes over time. In this traditional system, when there is a change in the topology, the corresponding data for the deleted node or link must be manually updated to remove the node or link from the configurable list. This introduces a manageability issue.

In a further example implementation, the network topology 300 is implemented as an OSPF/IS-IS topology using automation. In this implementation, the data (i.e., the interface names) on every node must be manually built. This is difficult to maintain when the topology changes. In this traditional system, when there is a change in the topology, the corresponding data for the deleted node or link must be manually updated to remove the node or link from the configurable list. This creates a manageability issue. These changes must be updated on each data list per node level that holds the link name details. This data further impacts the verification of OSPF/IS-IS states. If the change is not updated, then the verification checks on corresponding nodes will be affected.

Figure 4:
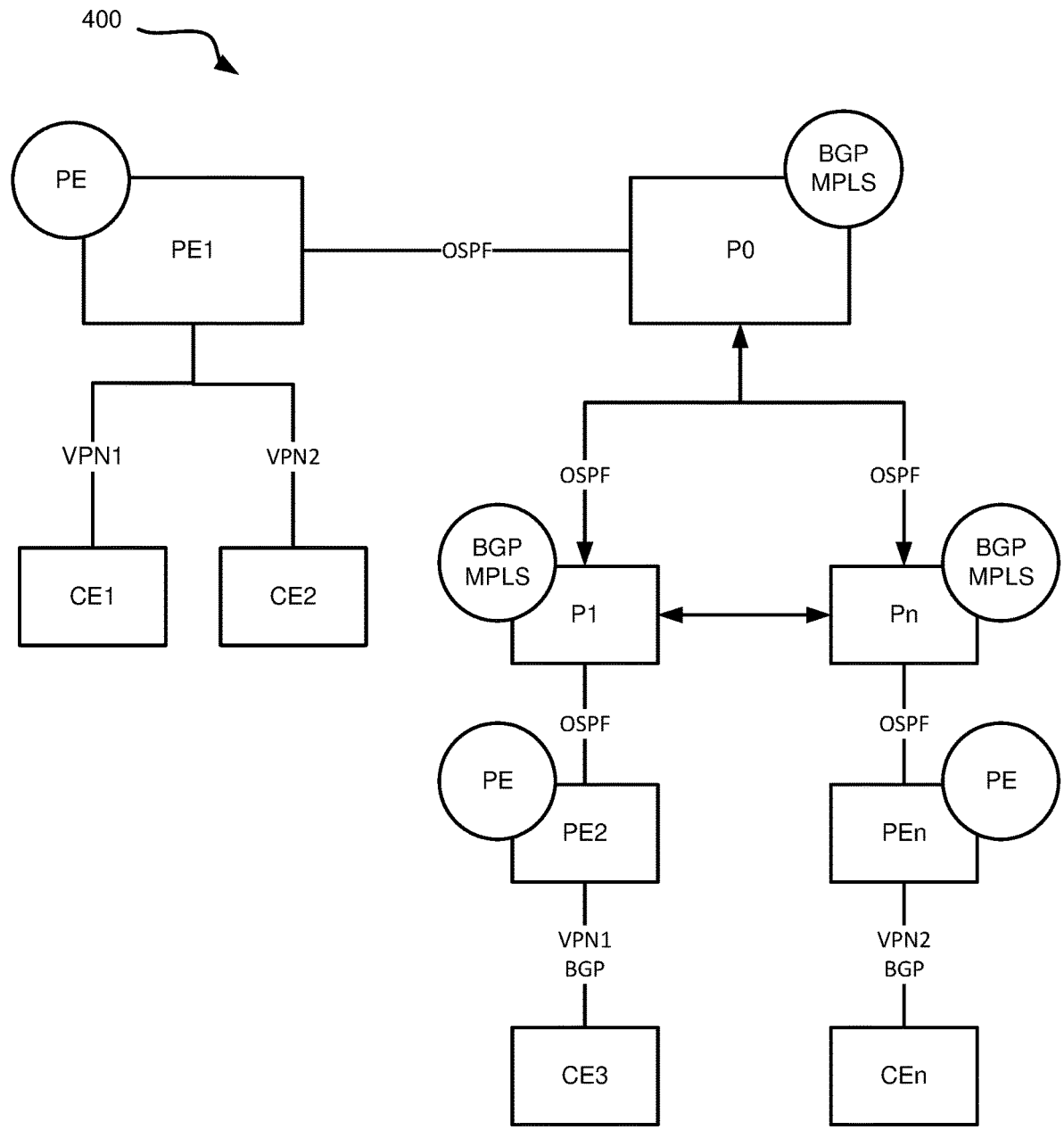
FIG. 4 is a schematic block diagram of the example network topology illustrated in FIG. 4A, further including an indication of the hardware and routing protocols implemented by the nodes and interfaces in the network topology.

FIG. 4 illustrates an automated network topology 400. In FIG. 4, the 4 nodes are identified as certain hardware or technology.

The automated network topology 400 includes a core layer including P0, P1, and up through Pn nodes. The automated network topology 400 further includes an edge layer including PE1, PE2, and up through PEn nodes as needed. Finally, the automated network topology 400 includes a customer layer including CE1, CE2, CE3, and up through CEn nodes as needed. Each of the core layer nodes, the edge layer nodes, and the customer layer nodes may be supported by any suitable hardware. For example, P1 to Pn nodes implemented as discussed herein may require support for BGP, RSVP, and OSPF protocols. PE1 to PEn nodes may require support for BGP, MPLS, RSVP, OSPF, and VPN protocols. CE1 to CEn nodes may require support for basic protocols such as static route.

As illustrated in FIG. 4, the core layer nodes P0, P1, and up through Pn may include MPLS Border Gateway Protocol (BGP) instances. The edge layers nodes, including PE1, PE2, and up through PEn, may include provider edge routers. The core layer nodes P0, P1, and up through Pn may communicate with one another by way of the Open Shortest Path First (OSPF) routing protocol. Further, the core layer nodes may communicate with the edge layer nodes by way of the OSPF routing protocol. The edge layer nodes may communicate with the customer layer nodes by way of virtual private networks.

The automated network topology 400 is implemented with tag identifiers, including node tag identifiers applied to the nodes (e.g., P0, P1, Pn, PE1, PE2, PEn, CE1, CE2, CE3, CEn) and interface tag identifiers applied to the interfaces between nodes. The tag identifiers include information about the role of the node, the number assigned to the node, the protocol implemented by the node, and so forth. The tag identifiers enable a computing system to automatically scale the automated network topology 400 and update path lists when nodes or interfaces are added, deleted, or otherwise modified. The tag identifiers may be stored as part of a topology descriptor file. The topology descriptor file defines the physical connections within the network topology 400, and the tags will be added to the topology descriptor file under nodes and under each link. The topology descriptor file may be used as an input data to an Application Program Interface (API) configured to build a template for the network topology 400 (see, e.g., configuration template 800 illustrated in FIGS. 8A-8B).

Traditional systems do not implement tag identifiers as described herein. These traditional systems are difficult to automate, and therefore, adjustments to the topology must often be manually inputted by a user. Traditional systems rely on IP addresses and interface names as part of the configuration file or configuration template. In traditional systems, a user must manually build the configuration using the configuration file or configuration template as a guide. In traditional systems, a user is tasked with manually hardcoding neighbor IP addresses in the network configuration and then loading the network configuration to the routers. In this case, it is difficult to manage the network and propagate and update when there is a change in the topology configuration or scale.

By contrast, the tag identifiers described herein are implemented to overcome many of the manageability issues associated with traditional systems. In the systems described herein, a user may build a descriptor file comprising tag identifiers under the nodes and interfaces within the network topology. The tag identifiers enable the network topology to be scaled up by adding nodes, scaled down by removing nodes, and modified without manually changing the configurations within the network or manually propagating an update to each router.

The method 500 may be partially manually inputted by a user and may further be automatically executed by a one or more processors within a network topology.

The method 500 includes building at 502 a network topology file with one or more tag identifiers. Each of the one or more tag identifiers is configured to uniquely identify the node or interface to which it is applied. The network topology descriptor file template illustrated in FIG. 7, which includes each of a node section, an interface section, and a links section. The tag identifiers are added to the network topology file in association with the nodes and the interfaces. An API may read the network topology file to generate a template, such as the template illustrated in FIG. 8.

The method 500 includes building at 504 an automated configuration template for the network topology that includes data pertaining to each node and interface within the network topology. The data includes one or more of an indication of what type of technology is enabled by each node, an indication of an interface allocated to the technology, an indication of the nearest neighbor address (in the case of a BGP network topology), and an indication of the tag identifiers to be configured.

The method 500 includes resolving at 506 the tag identifiers and extracting the nodes, addresses, and link data for the network topology. The process of resolving at 506 is automatically performed by one or more processors in communication with the network topology. The process of resolving at 506 may be implemented to identify new nodes, deleted nodes, or modified nodes within the network topology. In an implementation, an API reads the network topology file and resolves the tag identifiers, nodes, and interfaces. The API may generate a configuration template such as that described in connection with FIG. 8. The template is generated using the resolved data. If nodes need to be added or removed to resolve the tag identifiers at 506, the API will perform this step on the topology descriptor file 700 and then build the configuration template 800 based on the resolved topology descriptor file 700.

The method 500 includes creating at 508 a network configuration and sending the network configuration to the applicable routers. The process of creating the network configuration at 508 is automatically performed by one or more processors in communication with the network topology.

FIG. 6 is a block illustrating an example format 600 for a tag identifier as described herein. The example format 600 for the tag identifier includes an indication of the node level and the interface level. The node level may recite, for example, "TAG-ROLE-NODE_NUMBER-PROTOCOL-V4_V6-INSTANCE-TAG_NAME." The interface level may recite, for example, "TAG-PROTOCOL-V4/V6-SCALE-INSTANCE-TAG_NAME."

The format 600 for the tag identifier may be modified depending on the implementation or use-case. The format for the tag identifier may be defined for each protocol and/or feature. The tag identifier may be modified based on scale, which node the tag identifier is associated with, whether the tag identifier is implemented in a VPN instance, and so forth. An API will read the format 600 and build new data based on the information stored therein.

The format 600 may follow different parser specifications as needed and is not limited to the format 600 illustrated in FIG. 6. However, the format 600 may adhere to the following naming conventions in different implementation.

Naming convention for services: [TAG-ROLE-NODE_NUMBER-<SEVICE>-SCALE-INSTANCE-TAG_NAME:]. The name of the tag identifier may then be implemented according to the following conventions, depending on the protocol and the implementation.

[TAG-PE-1-VPN_L3_V4-10-VRF1-VPN1] for L3 VPN type V4;
[TAG-PE-1-VPN_L3_V6-10-VRF1-VPN1] for L3 VPN type V6 (6VPE);
[TAG-PE-1-VPN_6PE-10-VPN2] for 6PE;
[TAG-PE-1-VPN_VPLS-10-VRF2-VPN3] for VPLS; and
[TAG-PE-1-VPN_EVPN-10-VRF3-VPN4] for EVPN.

The node tag identifiers (i.e., the tag identifiers at the NODE LEVEL) may include a role name for the node and a node number associated with the node. The node tag identifier may further include an indication of the feature, protocol, and/or technical area associated with the node. The node tag identifier may further include an indication of whether scaling should be available in a VPN tag. The node tag identifier should be available on the node.

Naming conventions for service mapping to interface: [TAG-SERVICE-SCALE-INSTANCE-TAG_NAME:]. The name of the tag identifier may then be implemented according to the following conventions, depending on the protocol and the implementation:

[TAG-VPN_L3-V4-10-VRF1-VPN1] for L3 VPN type V4;
[TAG-VPN_L3-V6-10-VRF-VPN1] for L3VPN type V6; and
[TAG-VPN-6PE-10-VPN2] for 6PE.

The interface tag identifiers (i.e., the tag identifiers at the INTERFACE LEVEL) may include a name for the tag identifier. The interface tag identifiers may further include an indication of the feature, protocol, scale, and/or technical area associated with the interface.

Naming conventions for protocols: [TAG-ROLE-NODE_NUMBER-PROTOCOL-V4_V6-INSTANCE-TAG_NAME]. The name of the tag identifier may then be implemented according to the following conventions, depending on the protocol and the implementation:
- [TAG-P-1-OSPF-V4-default-OSPF1] when the topology is implemented with the OSPF protocol;
- [TAG-P-1-ISIS-V4-default-ISIS1] when the topology is implemented with the IS-IS protocol;
- [TAG-P-1-BGP-V4-default-BGP1] when the topology is implemented with BGP;
- [TAG-P-1-BGP-V6-default-BGP2] when the topology is implemented with BGP; or
- [TAG-P-1-BGP-V4-vrf1-BGP3] when the topology is implemented with BGP.

Various naming conventions may be selected and implemented based on which protocols are implemented on the nodes and interfaces of the network topology. For example, if OSPF must be enabled on a node, then an OSPF tag identifier will be attached to the node on that interface.

Naming conventions for protocol mapping to interface: [TAG-PROTOCOL-V4/V6-SCALE-INSTANCE-TAG_NAME]. The name of the tag identifier may then be implemented according to the following conventions, depending on the protocol and the implementation:
- [TAG-OSPF-V4-10-default-OSPF1] when the topology is implemented with the OSPF protocol;
- [TAG-ISIS-V6-10-default-ISIS1] when the topology is implemented with the IS-IS protocol;
- [TAG-BGP-V4-10-default-BGP1] when the topology is implemented with BGP;
- [TAG-BGP-V6-10-default-BGP2] when the topology is implemented with BGP; or
- [TAG-BGP-V4-10-vrf1-BGP3] when the topology is implemented with BGP.

Naming conventions for tunnels: [TAG-ROLE-NODE-NUMBER-TUNNEL_TYPE-TUNNEL_IDENTIFIER_TAG_NAMES]. The name of the tag identifier may then be implemented according to the following conventions, depending on the protocol and the implementation:
- [TAG-PE-1-RSVP-1-EDGE] when the topology implements the RSVP protocol;
- [TAG-PE-1-LDP-1_TRANSIT] when the topology implements an MPLS protocol such as LDP or RSVP on the nodes and/or interfaces;
- [TAG-EDGE-1-IPSEC-1_EDGE] when the topology implements security protocols on one or more of the nodes; or
- [TAG-EDGE-1-GRE-1_EDGE] when the topology implements security protocols on one or more of the nodes.

Naming conventions for QOS (Quality of Service): [TAG-ROLE-NODE_NUMBER-QOS_TYPE-FLAG_OPTION-TAG_NAME]. The name of the tag identifier may then be implemented according to the following conventions, depending on the protocol and the implementation. The unique tag identifier may be allocated for different QOS/COS components as outlined below, including CLASSIFIER, QUEUE_PROPERTY, WRED, and REWRITE.
- [TAG-PE-1-CLASSIFIER-D SCP-CLASS1];
- [TAG-PE-1-QUEUE_PROPERTY-BANDWIDTH-QUEUE1];
- [TAG-PE-1-WRED-ALL_QUEUES-WRED1]; or
- [TAG-PE-1REWRITE-DSCP-REWRITE1].

The parser specification may include a constraints check on the naming conventions. In some implementations, the protocol, feature, and/or technical area information should not be allowed on BOND member links. BOND member links do not carry configuration properties like protocols and features. Required features may be enabled on the BOND interface directly such that adding a tag identifier to a member link will enable protocols or features that should not be allowed.

In some implementations, L2 interfaces should not have protocol tag identifiers or L3 feature tag identifiers. In some cases, it is important to ensure that L3 protocols such as OSPF, ISIS, and BGP cannot be enabled on an L2 interface. In these cases, L3 protocol tag identifiers cannot be written to L2 interfaces.

In some implementations, tag identifiers within VPNs should not be added on interfaces that are a component of a default instance, and vice versa. An interface may be a component part of either default instance or VPN VRF instance. The interface should not be a component part of each of the default instance and the VPN VRF instance. In some cases, it is important to ensure that the VPN VRF instance is not exposed to the default instance.

In some implementations, tag identifiers for an L2 network should not be added on an L3 interface, and vice versa. In most implementations, the tag identifiers on an L2 interface should not be added to an L3 interface because L2 features are not compatible with L3 features. Thus, the tag identifiers configured to enable L2 features should not be part of an L3 interface, and vice versa.

In some implementations, an IPV6 family type should not be enabled on an IPV4-only interface, and vice versa. If dual stack (IPV4 and IPV6) is supported, then tag identifiers for each of IPV4 and IPV6 will be enabled.

FIG. 7 is a block illustrating a format for an example topology descriptor file 700 comprising tag identifiers for a network topology. The topology descriptor file 700 represents a simple network topology that includes two routers (represented by nodes r1 and r2) that are connected back-to-back and defined by the point-to-point links (p2p1 and p2p2).

The topology descriptor file 700 represents the network topology, including a plurality of nodes, interfaces, and links. The topology descriptor file 700 includes data pertaining to an r1 node and an r2 node. Each of the r1 node and the r2 node may represent a router within the network topology. Each of the r1 node and the r2 node includes numerous tag identifiers, including a node tag identifier and a plurality of independent interface tag identifiers.

The r1 node includes a node tag identifier that is unique to the r1 router. The node tag identifier for the r1 router may state, for example, [TAG-P-1-ISIS-V4-default-ISIS1] or [TAG-P-1-BGP-V4-default-BGP1_BGP2-AS1] depending on the implementation. This is based on the protocol to be enabled. For example, if BGP is enabled, then a BGP tag identifier will be implemented. Furthermore, if ISIS is enabled, then an ISIS tag identifier will be implemented. The node tag identifier is stored within the topology descriptor file 700.

The r1 node further includes a plurality of interface tag identifiers. The connectivity between two nodes is defined by the "links" section of the topology descriptor file 700 and is not handled by the tag identifiers. The links section provides information about source link names and destination link names. The interface tag identifier for the r1_1 connectivity point may read, for example, [TAG-ISIS-V4-10-default-ISIS1]. The r1 node further includes a third interface tag identifier associated with a loopback interface on the r1 node. The loopback interface provides a connection point for the r1 node to communicate with itself. The loopback interface within the topology enables loopback with automatic IP generation. The loopback interface may carry tag identifiers that are used to build BGP between loopback interfaces of multiple nodes. These tag identifiers on the loopback interfaces may further be used to build RSVP LSPs between the loopback interfaces.

Similarly, the r2 node includes a node tag identifier and a plurality of interface tag identifiers. The r2 router includes an r2_1 connection point to communicate with the r1 router by way of the r1_1 connection point on the r1 router, and further includes an r2_2 connection point to communicate with the r1 router by way of the r1_2 connection point on the r1 router. The r2 router further includes a loopback interface that enables the r2 router to communicate with itself. The r2 includes a node tag identifier associated with the r2 node itself. Like the node tag identifier associated with r1, the node tag identifier associated with r2 includes an indication of, for example, the role of the node, the identifier or number for the node, the protocol being implemented by the node, an indication of whether the node is IPV4 or IPV6, an indication of an instance on which the protocol will be implemented, a name for the tag identifier, an AS number for the tag identifier, a cluster tag identifier to generate a cluster identifier, and so forth. Further, the r2 node includes an interface tag identifier associated with each connection point on the r2 router. The r2 node specifically includes a first interface tag identifier for the r2_1 interface, a second interface tag identifier associated with the r2_2 interface, and a third interface tag identifier associated with the loopback on the r2 node.

The topology descriptor file 700 further includes an indication of the links within the network topology. The example network topology is a simple topology including two routers in a back-to-back configuration. Therefore, there is a point-to-point link from the r1 router to the r2 router by way of the r1_1 connection point and the r2_1 connection point. Additionally, there is a point-to-point link from the r2 router to the r1 router by way of the r1_2 connection point and the r2_2 connection point.

The topology descriptor file 700 defines the tag identifiers with two levels. The two levels include a first tag identifier level associated with the nodes, i.e., the node tag identifiers. The second level is associated with the connection points or interfaces on the nodes, i.e., the interface tag identifiers. The topology descriptor file 700 does not include tag identifiers defining the links between the nodes. The links section of the topology descriptor file 700 is used to connect two or more interfaces to each other. The tag identifiers are enabled only under the interfaces. The tag identifiers enabled under the interfaces will be used to enable protocols. In some implementations, there is no need to enable tag identifiers under the links section of the topology descriptor file 700 because interface tag identifiers will handle everything required for each interface.

Each point-to-point link corresponds to one Internet Protocol (IP) segment. The links sections within the network topology may include point-to-point links. The point-to-point connection refers to a communications connection between two communication endpoints or nodes. The point-to-point connections may specifically refer to a wire or other connection that links only two computers or circuits. The point-to-point connections are contrasted with point-to-multipoint or broadcast connections, in which many nodes can receive information transmitted by one node.

The broadcast links are within one IP segment. The tag is used to identify the broadcast links. The links sections within the network topology may include broadcast links. Broadcast links connect two or more nodes and support broadcast transmission, wherein one node can transmit data that can be received by a plurality of other nodes. Broadcast connections enable a large quantity of receiving nodes to receive data from a single transmitting node.

The loopback IP is configured to find loopbacks for each node within the network topology. These loopback IP addresses are configured to generate a unique IP per loopback. The interfaces sections within the network topology may include loopback addresses. A loopback address may be built into the IP domain system to allow a device to send and receive its own data packets. Loopback addresses may be useful in various kinds of analysis like testing and debugging, or in allowing routers to communicate in specific ways. When the network topology includes a loopback IP address, then a data packet may be sent through a network and routed back to the same device where the data packet originated.

Figure 8B:

FIGS. 8A-8B illustrate blocks illustrating an example autogenerated configuration template 800 for a topology comprising tag identifiers. The template 800 is automatically generated by a processor based on the topology descriptor file 700 illustrated in FIG. 7. The tag identifiers are illustrated with bold text. The template 800 includes configuration details for the network topology, including net addresses, an indication of which interface should be enabled, an indication of AS numbers, router identifiers, and so forth. If needed, a user may manually alter information within the automatically generated template 800 to change configurations for the network topology.

A complete copy of the template 800 is stored locally where an API is run. The API is configured to generate the template 800 based on the topology descriptor file 700. The template 800 is accessed when the topology and/or scale of the network is amended. When the network is amended, the tags within the topology descriptor file 700 will be updated, and then the API will be re-run to generate the template 800. The API reads the data from the topology descriptor file 700 to build the template 800 and then stores the template 800 locally. The template 800 is used to build the final configuration for the network and then push that configuration to the routers. The template 800 is rebuild whenever the topology descriptor file 700 is modified. This ensures that changes to the topology descriptor file 700 are used to create a modified template 800.

FIG. 9 is a block illustrating an IP auto generation configuration template 900. The template 900 is used to create point-to-point links or multipoint links. In the case of multipoint links, there will be a switch between nodes. The connection to the switch is identified using tag identifiers under each link. This will also be used to autogenerate IP addresses for the interfaces within the network. The link provides information regarding how the interfaces are connected with each other such that the API can generate IP addresses in the same segment.

FIG. 10 is a block illustrating an autogenerated template 1000 for a network topology. The template 1000 is automatically generated based on an input file, such as the topology descriptor file 700 illustrated in FIG. 7.

The Autonomous System (AS) number may group nodes together with a tag identifier. This generates the 2 byte/4yte AS number per tag identifier. The AS number may be needed when the network runs BGP. The network may include a group of nodes under the AS, and tag identifiers will be used to generate the appropriate AS number. The nodes are grouped based on the tag identifier, and then the AS number is generated based on the grouping of nodes.

The cluster identifier is implemented by verifying the "RR" role name as present in the tag identifier. The RR roles are grouped based on a cluster tag identifier. The cluster identifier is implemented per-RR based on the cluster tag identifier. The unique RR cluster identifier will be generated for each RR cluster. Members of the cluster will be grouped based on the cluster tag. The cluster identifier will be generated for the RR role within the cluster. The RR role is identified using the role mentioned in the tag identifier, and then the cluster unique identifier will be generated.

Figure 11:
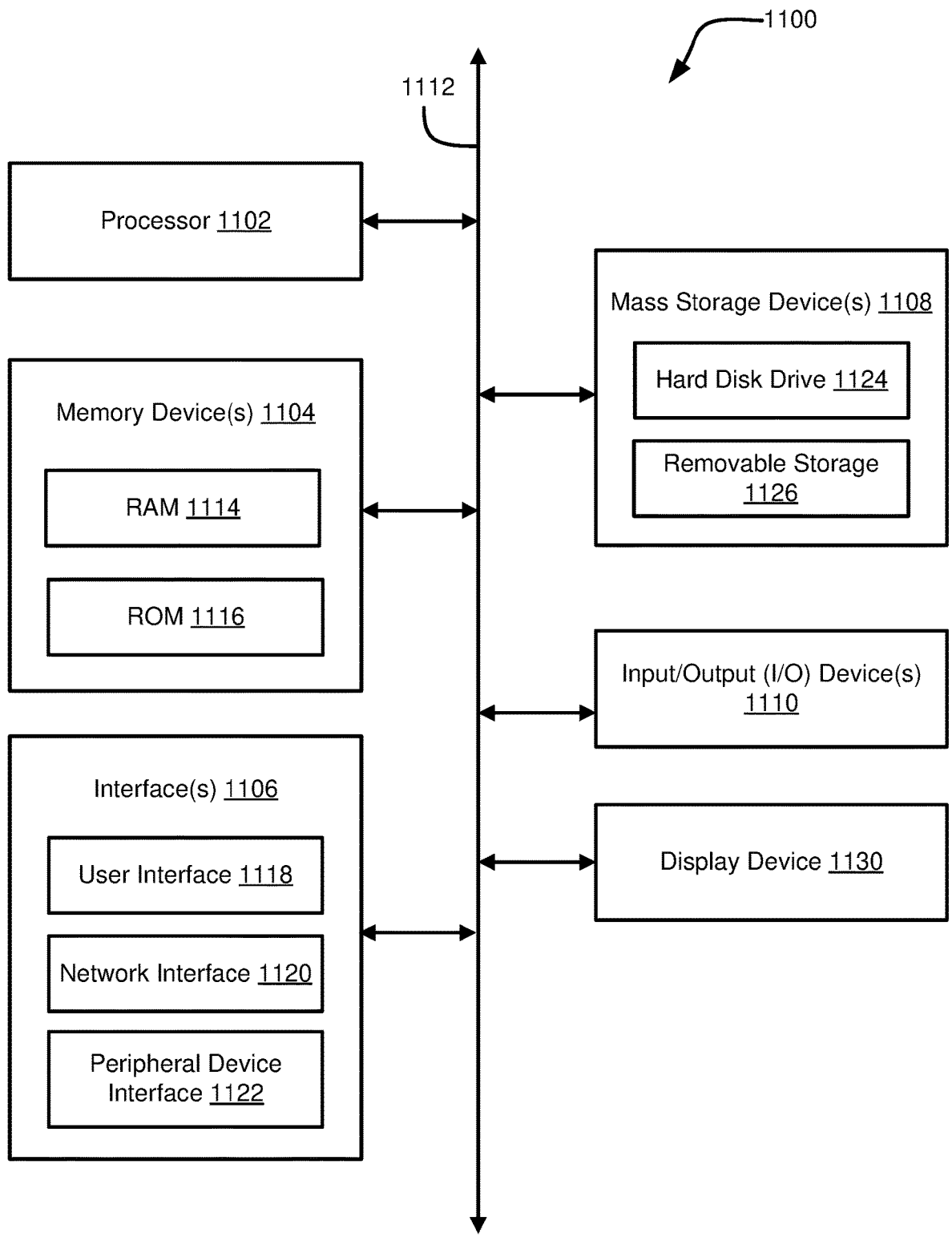
FIG. 11 is a schematic diagram illustrating components of an example computing device.

Referring now to FIG. 11, a block diagram of an example computing device 1100 is illustrated. Computing device 1100 may be used to perform various procedures, such as those discussed herein. In one embodiment, the computing device 1100 can function to perform the functions of the asynchronous object manager and can execute one or more application programs. Computing device 1100 can be any of a wide variety of computing devices, such as a desktop computer, in-dash computer, vehicle control system, a notebook computer, a server computer, a handheld computer, tablet computer and the like.

Computing device 1100 includes one or more processor(s) 1102, one or more memory device(s) 1104, one or more interface(s) 1106, one or more mass storage device(s) 1108, one or more Input/output (I/O) device(s) 1102, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include several types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

Input/output (I/O) device(s) 1102 include various devices that allow data and/or other information to be input to or retrieved from computing device 1100. Example I/O device(s) 1102 include cursor control devices, keyboards, keypads, microphones, monitors or other display devices, speakers, printers, network interface cards, modems, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 may include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more user interface elements 1118. The interface(s) 1106 may also include one or more peripheral interfaces such as interfaces for printers, pointing devices (mice, track pad, or any suitable user interface now known to those of ordinary skill in the field, or later discovered), keyboards, and the like.

Bus 1112 allows processor(s) 1102, memory device(s) 1104, interface(s) 1106, mass storage device(s) 1108, and I/O device(s) 1102 to communicate with one another, as well as other devices or components coupled to bus 1112. Bus 1112 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1100 and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method. The method includes generating a configuration template for a network topology based on a topology descriptor file, wherein the network topology comprises a plurality of nodes, and wherein the topology descriptor file comprises a plurality of unique node tag identifiers that are each assigned to a node of the plurality of nodes within the network topology. The method includes resolving each of the plurality of unique node tag identifiers based on the plurality of nodes within the network topology. The method includes generating a network configuration for the network topology.

Example 2 is a method as in Example 1, further comprising providing the network configuration to each of a plurality of routers within the network topology.

Example 3 is a method as in any of Examples 1-2, wherein resolving each of the plurality of unique node tag identifiers comprises identifying a modification within the network topology, wherein the modification comprises one or more of: a new node within the network topology; a deleted node within the network topology; or a modified node within the network topology.

Example 4 is a method as in any of Examples 1-3, wherein resolving each of the plurality of unique node tag identifiers further comprises resolving the topology descriptor file to reflect the modification.

Example 5 is a method as in any of Examples 1-4, wherein generating the network configuration comprises generating based on the resolved topology descriptor file.

Example 6 is a method as in any of Examples 1-5, further comprising automatically generating a revised network configuration for the network topology each time a new modification is made to the network topology.

Example 7 is a method as in any of Examples 1-6, wherein generating the configuration template comprises implementing an Application Program Interface (API) configured to automatically generate the configuration template based on the topology descriptor file.

Example 8 is a method as in any of Examples 1-7, wherein each of the plurality of unique node tag identifiers is associated with one or more corresponding nodes, and wherein each of the plurality of unique node tag identifiers comprises an indication of a role and a protocol for the one or more corresponding nodes.

Example 9 is a method as in any of Examples 1-8, wherein generating the network configuration comprises autogenerating Internet Protocol (IP) addresses for interfaces within the network topology based at least in part on the topology descriptor file.

Example 10 is a method as in any of Examples 1-9, wherein resolving each of the plurality of unique node tag identifiers comprises identifying a modification made to the network topology, and wherein generating the network configuration for the network topology comprises automatically modifying the IP addresses for at least one of the interfaces based on the modification made to the network topology.

Example 11 is a method as in any of Examples 1-10, wherein the configuration template comprises configuration data for the network topology comprising one or more of a net address, an indication of which interface within the network topology should be enabled, an indication of an Autonomous System (AS) number, or an indication of a router within the network topology.

Example 12 is a method as in any of Examples 1-11, wherein the configuration template comprises an AS number, and wherein the AS number groups two or more nodes together with a single unique node tag identifier.

Example 13 is a method as in any of Examples 1-12, further comprising: determining that a modification has been made to the topology descriptor file since the network configuration was generated; automatically generating a revised configuration template for the network topology based on the modified topology descriptor file; and automatically regenerating a revised network configuration based on the revised configuration template.

Example 14 is a method as in any of Examples 1-13, wherein the network topology is a full mesh Border Gateway Protocol (BGP) network.

Example 15 is a method as in any of Examples 1-14, wherein the network topology is a full mesh Resource Reservation Protocol (RSVP) Link State Packet (LSP) network.

Example 16 is a method as in any of Examples 1-15, wherein the network topology is a virtual private network (VPN).

Example 17 is a method as in any of Examples 1-16, wherein the network topology operates under an Intermediate System to Intermediate System (IS-IS) routing protocol.

Example 18 is a method as in any of Examples 1-17, wherein each of the plurality of unique node tag identifiers comprises one or more of a role for a corresponding node, a protocol being implemented by the corresponding node, a number for the corresponding node within the network topology, a name for the unique node tag identifier, an AS number for the unique tag identifier, or a cluster tag identifier.

Example 19 is a method as in any of Examples 1-18, further comprising automatically generating a revised configuration template for the network topology each time the topology descriptor file is modified.

Example 20 is a method as in any of Examples 1-19, further comprising automatically generating a revised network configuration and propagating the revised network configuration to all routers within the network topology each time the topology descriptor file is modified.

Example 21 is a system comprising one or more processors configured to execute the method of any of Examples 1-20.

Example 22 is non-transitory computer readable storage medium storing instructions for execution by one or more processors, wherein the instructions comprise the method of any of Examples 1-20.

The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
receiving, by a computer system, a topology descriptor file including a plurality of unique node tag identifiers, each node of a plurality of nodes within a network topology being assigned a node tag identifier of the plurality of unique node tag identifiers identifying a role of the each node and a node tag name, the topology descriptor file further including one or more interface tags for each node of the plurality of nodes, each interface tag of the one or more interface tags including a role for an interface of one or more interfaces of the each node according to border gateway protocol (BGP) and an interface tag name for the interface;
processing, by the computer system, the topology descriptor file, to generate a configuration template including, a configuration for each node of the plurality of nodes and each interface of the one or more interfaces of the each node, the configuration for each interface of the one or more interfaces of each node including an internet protocol (IP) address and one or more interface tag names for the one or more interfaces of one or more other nodes of the plurality of nodes that are neighbors of the each node according to BGP; and
generating a network configuration for the network topology according to the configuration template, the network configuration including a full mesh BGP network.

2. The method of claim 1, further comprising providing the network configuration to each of a plurality of routers within the network topology.

3. The method of claim 1, further comprising:
receiving a change to the topology descriptor file;
identifying at least one of new nodes, deleted nodes, or modified nodes within the network topology according to the topology descriptor file; and
generating a new configuration template according to the topology descriptor file.

4. The method of claim 3, further comprising automatically generating a revised network configuration for the network topology each time a new modification is made to the network topology.

5. The method of claim 1, wherein generating the configuration template comprises implementing an Application Program Interface (API) configured to automatically generate the configuration template based on the topology descriptor file.

6. The method of claim 1, wherein each of the plurality of unique node tag identifiers is associated with one or more corresponding nodes, and wherein each of the plurality of unique node tag identifiers comprises an indication of a role and a protocol for the one or more corresponding nodes.

7. The method of claim 1, wherein generating the network configuration comprises autogenerating Internet Protocol (IP) addresses for interfaces within the network topology based at least in part on the topology descriptor file.

8. The method of claim 7, wherein resolving each of the plurality of unique node tag identifiers comprises identifying a modification made to the network topology, and wherein generating the network configuration for the network topology comprises automatically modifying the IP addresses for at least one of the interfaces based on the modification made to the network topology.

9. The method of claim 1, wherein the configuration template comprises configuration data for the network topology comprising one or more of a net address, an indication of which interface within the network topology should be enabled, an indication of an Autonomous System (AS) number, or an indication of a router within the network topology.

10. The method of claim 1, wherein the configuration template comprises an AS number, and wherein the AS number groups two or more nodes together with a single unique node tag identifier.

11. The method of claim 1, further comprising:
determining that a modification has been made to the topology descriptor file since the network configuration was generated;
automatically generating a revised configuration template for the network topology based on the modified topology descriptor file; and
automatically regenerating a revised network configuration based on the revised configuration template.

12. The method of claim 1, wherein the network topology is a full mesh Border Gateway Protocol (BGP) network.

13. The method of claim 1, wherein the network topology is a full mesh Resource Reservation Protocol (RSVP) Link State Packet (LSP) network.

14. The method of claim 1, wherein the network topology is a virtual private network (VPN).

15. The method of claim 1, wherein the network topology operates under an Intermediate System to Intermediate System (IS-IS) routing protocol.

16. The method of claim 1, wherein each of the plurality of unique node tag identifiers comprises one or more of a role for a corresponding node, a protocol being implemented by the corresponding node, a number for the corresponding node within the network topology, a name for the unique node tag identifier, an AS number for the unique tag identifier, or a cluster tag identifier.

17. The method of claim 1, further comprising automatically generating a revised configuration template for the network topology each time the topology descriptor file is modified.

18. The method of claim 1, further comprising automatically generating a revised network configuration and propagating the revised network configuration to all routers within the network topology each time the topology descriptor file is modified.

* * * * *